US009846837B1

(12) United States Patent
Narayanaswami et al.

(10) Patent No.: US 9,846,837 B1
(45) Date of Patent: *Dec. 19, 2017

(54) NEURAL NETWORK INSTRUCTION SET ARCHITECTURE

(71) Applicant: Google Inc., Mountain View, CA (US)

(72) Inventors: Ravi Narayanaswami, San Jose, CA (US); Dong Hyuk Woo, San Jose, CA (US); Olivier Temam, Antony (FR); Harshit Khaitan, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/336,216

(22) Filed: Oct. 27, 2016

(51) Int. Cl.
*G06N 3/04* (2006.01)

(52) U.S. Cl.
CPC ..................... *G06N 3/04* (2013.01)

(58) Field of Classification Search
CPC ............ G06N 3/04; G06N 3/06; G06N 3/063; G06N 3/0635; G06N 3/067; G06N 3/0675; G06F 13/28
USPC ..................................................... 706/26–27
See application file for complete search history.

(56) References Cited

U.S. PATENT DOCUMENTS

| 5,325,464 | A | * | 6/1994 | Pechanek | ................ | G06N 3/10 706/41 |
| 5,422,983 | A |   | 6/1995 | Castelaz et al. | | |
| 7,426,501 | B2 |  | 9/2008 | Nugent | | |

| 2013/0073497 | A1  |   | 3/2013 | Akopyan et al. |   |
| 2013/0212052 | A1  | * | 8/2013 | Yu           | G06N 3/08 706/25 |
| 2014/0067735 | A1  | * | 3/2014 | Yu           | G06N 3/04 706/20 |
| 2014/0114893 | A1  |   | 4/2014 | Arthur et al. |  |
| 2017/0103041 | A1  | * | 4/2017 | Henry        | G06F 15/82 |
| 2017/0103300 | A1  | * | 4/2017 | Henry        | G06F 9/44505 |
| 2017/0103301 | A1  | * | 4/2017 | Henry        | G06N 3/063 |
| 2017/0103302 | A1  | * | 4/2017 | Henry        | G06F 9/44505 |
| 2017/0103307 | A1  | * | 4/2017 | Henry        | G06N 3/04 |
| 2017/0103309 | A1  | * | 4/2017 | Chang        | G06N 3/04 |
| 2017/0103310 | A1  | * | 4/2017 | Henry        | G06N 3/04 |

(Continued)

OTHER PUBLICATIONS

'cs231n.github.io' [online]. "CS231n Convolutional Neural Networks for Visual Recognition," publication date not available, [retrieved on Oct. 22, 2016]. Retrieved from the Internet: URL<http://cs231n.github.io/neuralnetworks1/>. 13 pages.

(Continued)

*Primary Examiner* — Dave Misir
(74) *Attorney, Agent, or Firm* — Fish & Richardson P.C.

(57) ABSTRACT

A computer-implemented method that includes receiving, by a processing unit, an instruction that specifies data values for performing a tensor computation. In response to receiving the instruction, the method may include, performing, by the processing unit, the tensor computation by executing a loop nest comprising a plurality of loops, wherein a structure of the loop nest is defined based on one or more of the data values of the instruction. The tensor computation can be at least a portion of a computation of a neural network layer. The data values specified by the instruction may comprise a value that specifies a type of the neural network layer, and the structure of the loop nest can be defined at least in part by the type of the neural network layer.

16 Claims, 5 Drawing Sheets

(56) References Cited

U.S. PATENT DOCUMENTS

2017/0103311 A1* 4/2017 Henry .................. G06N 3/04
2017/0103320 A1* 4/2017 Henry .................. G06N 3/088

OTHER PUBLICATIONS

'pages.cs.wisc.edu' [online] "A Basic Introduction to Neural Networks," Apr. 30, 1996, [retrieved on Oct. 22, 2016]. Retrieved from the Internet: URL<http://pages.cs.wisc.edu/~bolo/shipyard/neural/local.html.> 5 pages.
Chen et al., "DaDianNao: A Machine-Learning Supercomputer," Proceedings of the 47th Annual IEEE/ACM International Symposium on Microarchitecture. IEEE Computer Society, 2014, 14 pages.
Chen et al., "DianNao: A Small-Footprint High-Throughput Accelerator for Ubiquitous Machine-Learning," ACM Sigplan Notices, 2014, vol. 49. No. 4. ACM, 15 pages.
Chi et al., "PRIME: A Novel Processing-in-memory Architecture for Neural Network Computation in ReRAM-based Main Memory," Proceedings of ISCA, 2016, vol. 43, 13 pages.
Liu et al., "Cambricon: an instruction set architecture for neural networks," Proceedings of the 43rd ACM/IEEE International Symposium on Computer Architecture (ISCA'16), 2016, pp. 393-405.
U.S. Appl. No. 15/014,265, filed Feb. 3, 2016, Woo et al.
Shafiee et al. "ISAAC: A Convolutional Neural Network Accelerator with In-Situ Analog Arithmetic in Crossbars," 2016 ACM/IEEE 43rd Annual International Symposium on Computer Architecture, Jun. 18, 2016, 13 pages.

* cited by examiner

| Operation Code (Opcode) | Operation Type | Operation Description |
|---|---|---|
| 0 | TensorOp | Computations at the convolution and/or FC layers |
| 1 | TensorOp | Computations at the max pooling layers |
| 2 | TensorOp | Computations at the average pooling layers |
| 3 | TensorOp | Computations at the depth-wise convolution and/or element-wise multiply layers |
| 4 | DMAOp.In | Compute tile (system 100) receives input activations and other data from instruction set 103 (via an example data bus) and place data in first bank 112 |
| 5 | DMAOp.Out | Compute tile reads data from first bank 112 and writes the data to an example data bus to output the data from system 100 |
| 6 | DMAOp.W-N | Compute tile moves data between the first bank 112 (N-mem) and the second bank 114 (W-mem). With this operation, data is moved from W-mem to N-mem |
| 7 | DMAOp.N-W | Compute tile moves data between the first bank 112 (N-mem) and the second bank 114 (W-mem). With this operation, data is moved from N-mem to W-mem |
| 8 | DMAOp.R-bus | Compute tile writes data to second bank 114 after retrieving the data from instruction set 103 (via an example data bus); or operation to read data from second bank and write the data to the bus to output the data from the compute tile |
| 9* | DMAOp.InFeed* | Higher level controller (external to compute tile) sends activations and weights/parameter to compute tile |
| 10* | DMAOp.OutFeed* | Higher level controller moves inference workload results from classifier tile to external I/O device |
| 11 | TileFenceOp | Operation to prevent any new instructions from being issued until pending instructions in the respective instruction buffers are retired |
| 12 | ScalarFenceOp | Operation to prevent issuance of new instructions until a threshold tilefenseop count is reached |

* - Associated, in part, with operation performed by higher level controller device that is external to compute tile(s)

*FIG. 3*

```
402
output [ : ] [ : ] [ : ] = 0
for xx in range (1, 50 , stride=10) :
 for yy in range (1, 50 , stride=10) :
  for x in range (xx, xx+10) :
   for y in range (yy, yy+10) :
    for kx in range (1, 5) :
     for ky in range (1, 5) :
      for zi in range (1, 3) :
       for zo in range (1, 16) :
        output [ x ] [ y ] [ zo ]  += input [ x+kx ] [ y+ky ]
```

NEURAL NETWORK INSTRUCTION SET ARCHITECTURE

BACKGROUND

This specification relates to an instruction set for computation of Deep Neural Network ("DNN").

Neural networks are machine learning models that employ one or more layers of models to generate an output, e.g., a classification, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters.

Some neural networks include one or more convolutional neural network layers. Each convolutional neural network layer has an associated set of kernels. Each kernel includes values established by a neural network model created by a user. In some implementations, kernels identify particular image contours, shapes, or colors. Kernels can be represented as a matrix structure of weight inputs. Each convolutional layer can also process a set of activation inputs. The set of activation inputs can also be represented as a matrix structure.

SUMMARY

One innovative aspect of the subject matter described in this specification can be embodied in a computer-implemented method. The method includes receiving, by a processing unit, an instruction that specifies parameters for performing a tensor computation. In response to receiving the instruction, the method may include, performing, by the processing unit, the tensor computation by executing a loop nest comprising a plurality of loops, wherein a structure of the loop nest is defined based on one or more of the parameters of the instruction. These and other implementations can each optionally include one or more of the following features. For example, the tensor computation can be at least a portion of a computation of a neural network layer. The parameters specified by the instruction may comprise a parameter that specifies a type of the neural network layer, and the structure of the loop nest can be defined at least in part by the type of the neural network layer.

In some implementations, the tensor computation is at least a portion of a computation of a neural network layer. In some implementations, the data values specified by the instruction comprises at least one value that specifies a type of the neural network layer, and wherein the structure of the loop nest is defined at least in part by the type of the neural network layer. In some implementations, the instruction causes the processing unit to access at least one element of a dimension of a tensor, the element being a part of at least one index used in executing the loop nest during performance of the tensor computation. In some implementations, the instruction causes the processing unit to access at least one memory address of an array in a storage medium, the memory address of the array comprising a variable that is read by the processing unit during performance of the tensor computation.

In some implementations, performing the tensor computation comprises, providing, by the processing unit, at least one control signal to a tensor traversal unit (TTU) to cause the TTU to emit loop indices used in executing the loop nest during performance of the tensor computation. In some implementations, the method further comprises, providing, by the processing unit, at least one control signal to the TTU to cause an array reference of the TTU to generate an address for a referenced array element used in executing the loop nest during performance of the tensor computation. In some implementations, instruction indicates a first TTU counter that is summed with a second TTU counter to generate an address for an array reference associated with the TTU.

In some implementations, performing the tensor computation comprises, executing, by the processing unit, a first sync procedure that manages one or more operands associated with performance of the tensor computation, wherein managing an operand comprises stalling one or more loop nests based on a sync flag condition. In some implementations, performing the tensor computation comprises, executing, by the processing unit, a second sync procedure that manages incrementing a counter associated with a characteristic of the loop nest.

Another innovative aspect of the subject matter described in this specification can be embodied in an electronic system, comprising: a processing unit disposed in the electronic system, the processing unit including one or more processing devices; and one or more machine-readable storage devices for storing instructions that are executable by the one or more processing devices to perform operations comprising: receiving, by the processing unit, an instruction that specifies data values for performing a tensor computation; and in response to receiving the instruction, performing, by the processing unit, the tensor computation by executing a loop nest comprising a plurality of loops, wherein a structure of the loop nest is defined based on one or more of the data values of the instruction.

Yet another innovative aspect of the subject matter described in this specification can be embodied in a non-transitory computer-readable storage medium comprising instructions executable by a processing unit which, upon such execution, causes the processing unit to perform operations comprising: receiving, by the processing unit, an instruction that specifies data values for performing a tensor computation; and in response to receiving the instruction, performing, by the processing unit, the tensor computation by executing a loop nest comprising a plurality of loops, wherein a structure of the loop nest is defined based on one or more of the data values of the instruction.

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented in particular embodiments so as to realize one or more of the following advantages. A processing unit can initiate programs to iterate deeply-nested loops with one instruction. The processing unit can execute received instructions encoded with data values for performing a tensor computation. Computation bandwidth of the processing unit is increased by reducing the number of instructions that the processor is required to execute when traversing a tensor to perform one or more computations. Instructions for performing tensor computations for a given neural network layer can be encoded and distributed amongst one or more computing systems of an example hardware computing system. Distribution of the encoded instructions to the various compute systems allows for increased computation bandwidth within a single system. Instruction quantity in a compute system is reduced because a single system is responsible only for a subset of the total computations needed for a given tensor.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 3 illustrates an example table that includes opcodes and corresponding operations performed, at least in part, by the example computation system of FIG. 1.

Like reference numbers and designations in the various drawings indicate like elements.

DETAILED DESCRIPTION

Figure 1:
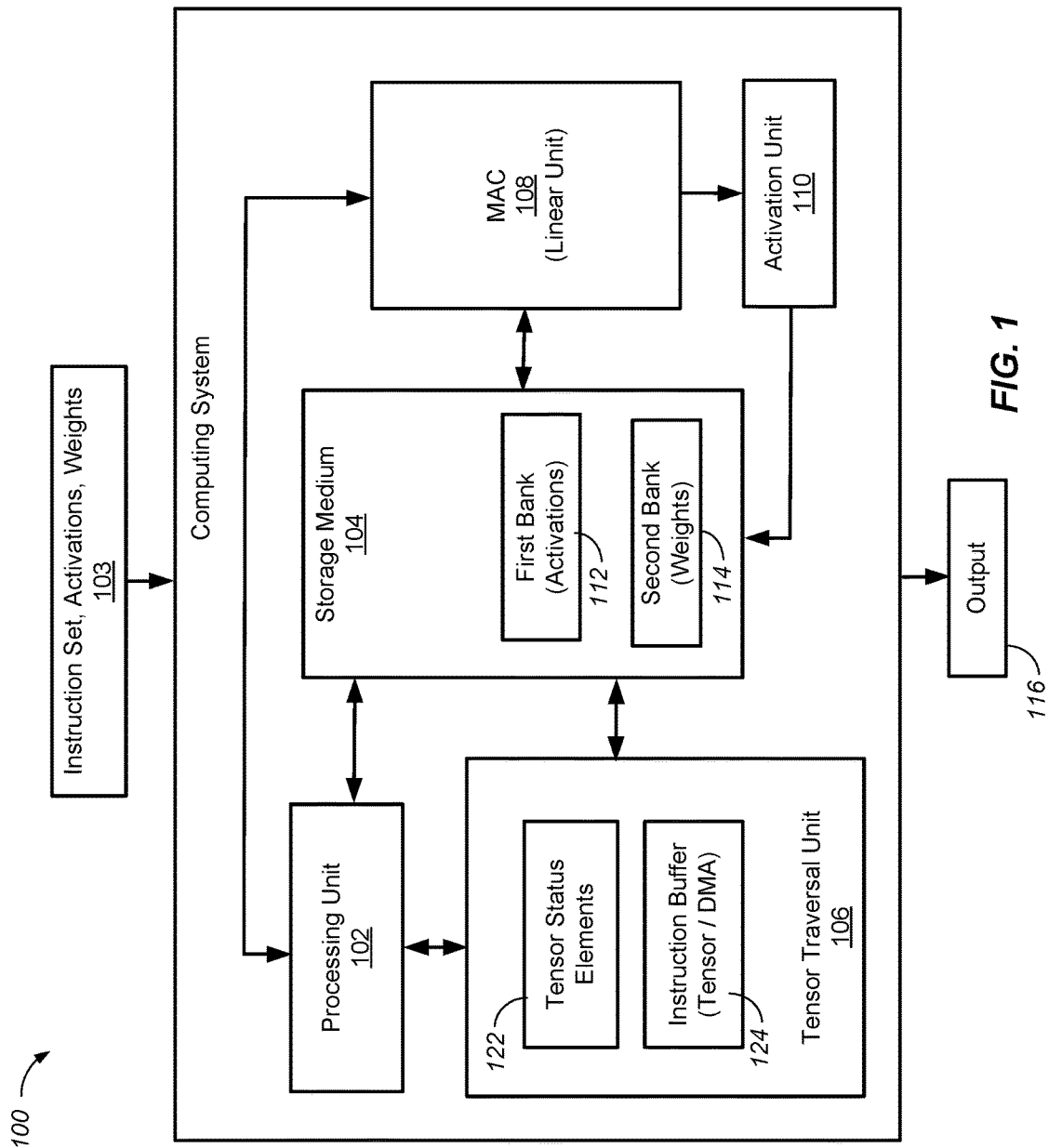
FIG. 1 is a block diagram of an example computation system.

The subject matter described in this specification relates to a computer-implemented process or method to accelerate machine learning inference workloads such that a processing unit performing the workload can achieve high performance and low energy consumption while executing computations. The processes and methods described in this specification can be executed within hardware computing systems that are organized as a set of tiles, each of which are self-contained and can independently execute at least a portion of the computation required by a neural network layer.

A computation process performed within a neural network may consist of multiplication of an input tensor with a parameter/weight tensor on one or more cycles and performing an accumulation of the products over many cycles. An input-weight multiplication may then be written as the sum-of-product of each weight element multiplied with a row of the input tensor or matrix. Deep Neural Networks (DNNs) include multiple layers that feed into each other. Inference workloads that include tensor computations for a given layer are accelerated by the methods described in this specification.

In general, when a software algorithm performs tensor computations by processing an N-dimensional tensor, a nested loop can be used, where each loop is responsible for traversing each dimension of the N-dimensional tensor. A multi-dimensional tensor can be a matrix, or multi-dimensional matrices. Each dimension of the N-dimensional tensor may include one or more elements, where each element may store a respective data value. For example, a tensor can be a variable in a program, where the variable may have three dimensions. The first dimension may have a length of three hundred elements, the second dimension may have a length of thousand elements, and the third dimension may have a length of twenty elements.

Traversing the tensor in a nested loop requires a computation of a memory address value of an element to load or store the corresponding data value of the element. For example, a for-loop is a nested loop, where three loops tracked by three loop index variables can be nested to traverse through the three-dimensional tensor. In some cases, a processor may need to execute a loop bound condition, such as setting a loop bound of an inner loop with an outer loop index variable. For example, in determining whether to exit the inner-most loop of a nested loop, the program may compare the current value of the loop index variable of the inner-most loop with the current value of the loop index variable of the outer-most loop of the nested loop.

Computational tasks associated with traversing a three-dimensional tensor can require a significant number of instructions such as branch instructions and integer arithmetic instructions. When each loop bound is small and the number of loops is large, the computations for memory address computation and tensor dimension traversal may take a significant portion of the overall execution time, and seriously degrade overall performance. A computer-implemented method executable by a processing unit that receives instructions encoded with data values for performing a tensor computation may increase the computation bandwidth of the processing unit by reducing the number of instructions that the processor is required to execute when traversing a tensor to perform one or more computations.

Instructions for performing tensor computations for a given layer can be encoded and distributed amongst one or more computing systems (described below as compute tiles) within an example hardware computing system. Distribution of the encoded instructions to the various compute tiles allows for increased computation bandwidth within a single tile. Moreover, by distributing computations amongst multiple compute tiles, a processing unit of a compute tile consumes a reduced number of instructions (as compared to current systems) when traversing the tensor. Instruction quantity in a compute tile is reduced because a single tile is responsible only for a subset of the total computations needed for a given tensor.

Additional details and descriptions relating to hardware computing systems for accelerating neural network tensor computations including dot-product and matrix-multiplications for neural network inference workloads are described in U.S. patent application Ser. No. 15/335,769, entitled "Neural Network Compute Tile", filed on Oct. 27, 2016. The entire disclosure of U.S. patent application Ser. No. 15/335,769 is expressly incorporated by reference herein in its entirety.

FIG. 1 shows a block diagram of an example computing system 100 for traversing one or more tensors to perform computations for a neural network layer. As shown, computing system 100 includes a processing unit 102, a storage medium 104, tensor traversal unit (TTU) 106, a multiply accumulate (MAC) operator 108, and an activation unit 110. Although a single TTU is shown, system 100 can include two or more TTUs 106 to process tensor traversal operations as well as memory access operations when one or more compute tiles are used to process tensor computations for a given neural network layer. Likewise, although a single MAC is shown, system 100 can include multiple MAC operators 108.

The processing unit 102 is configured to process instructions for execution within the computing system 100, including instructions or program code stored in the storage medium 104 or other instructions/code stored in another storage device. The processing unit 102 may include one or more processors. Storage medium 104 can include one or more memory banks or units, including first bank 112 for storing activations and second bank 114 for storing weights. In some implementations, storage medium 104 is a volatile memory unit or units. In some other implementations, storage medium 104 is a non-volatile memory unit or units such as, for example, read-only memory (ROM) and/or electrically erasable programmable read-only memory (EEPROM). The storage medium 104 may also be another form of computer-readable medium, such as a floppy disk device, a hard disk device, an optical disk device, or a tape device, a flash memory or other similar solid state memory device, or an array of devices, including devices in a storage area network or other configurations.

Instruction set 103, when executed by the processing unit 102, causes the processing unit 102 to perform one or more tasks that include, for example, storing activations in memory address locations of first bank 112 and storing weights in memory address locations of second bank 114. Moreover, instructions 103 can also cause processing unit 102 to access the stored data from first bank 112 and second bank 114 and provide the accessed data to MAC operator 108. As described in more detail below, MAC operator 108 can perform multiply operations that can include multiplying an activation with a weight to produce either a partial sum(s) or to produce an output activation(s) that is provided to activation unit 110.

In general, the computing system 100 processes one or more instructions included within instruction set 103 to generate an output 116. Instruction set 103 can include at least one of a tensor operation (tensorop) instruction or direct memory access operation (DMAop) instruction. Computing system 100 can be configured to execute at least one tensorop and at least one DMAop instruction to perform tensor computations that include multiple linear algebra computations.

As shown, TTU 106 can include instruction buffer 124. Although a single instruction buffer 124 is shown, compute system 100 may include multiple instruction buffers 124. Moreover, system 100 can include multiple TTUs 106 and each TTU 106 can include one or more instruction buffers 124. In some implementations, the different instruction buffers 124 within system 100 can include a tensorop instruction buffer and a DMAop instruction buffer. As described in more detail below, instructions received by system 100 and executed by processing unit 102 can include one of a tensorop instruction and the DMAop instruction. In some implementations, the received instructions are stored in instruction buffer 124 prior to execution by processing unit 102.

As discussed in more detail below with reference to FIG. 4, activations can be pre-loaded to first bank 112 in respective memory address locations that correspond to elements of an input tensor. Likewise, weights can be pre-loaded to second bank 114 in respective memory address locations that correspond to elements of a weight tensor. In some implementations, instructions, activations, and weights are provided to system 100 from an external or higher level control device associated with a neural network hardware computing system.

In general, when the processing unit 102 executes one or more instructions for accessing a particular element of a tensor, the tensor traversal unit 106 determines the memory address of the element, such that the processing unit 102 may access storage medium 104 to read data representing the value of the particular element. For example, instructions stored in storage medium 104 can include program code for a nested loop program that can be executed by processing unit 102. The nested loop program can include multiple variables that can have a range of values that are determined based on data values provided by instruction set 103. Processing unit 102 may execute the program code for the nested loop program to cause TTU 106 to access memory address locations that correspond to respective elements of at least two multi-dimensional arrays.

Based on current index variable values associated with the nested loop, the TTU 106 may determine an offset value that represents an offset from a first element of the multi-dimensional array variable. The processing unit 102 may then access, using the offset value and from the storage medium, the particular element of the two-dimensional array variable.

The tensor traversal unit 106 is configured to determine a status associated with one or more tensors. The status can include loop bound values, current loop index variable values, dimension multipliers for computing a memory address value, and/or program counter values for handling branch loop bounds. The tensor traversal unit 106 includes tensor status elements 122 and an arithmetic logic unit. Each of the tensor status elements 122 can be a storage element, for example a register or any other suitable storage circuitry. In some implementations, the tensor status elements 122 can be physically or logically arranged into different groups.

In some implementations, a group of the tensor status elements 122 can be physically or logically arranged into a multi-dimensional array. For example, each group of the tensor status elements 122 can be physically or logically arranged into a two-dimensional array. The arithmetic logic unit includes one or more arithmetic logic units (ALUs) that are configured to perform arithmetic and logic operations. For example, the arithmetic logic unit may include digital circuitry that is configured to perform addition, subtraction, multiplication, division, logic AND, logic OR, or any other suitable arithmetic and logic operations.

Figure 2:
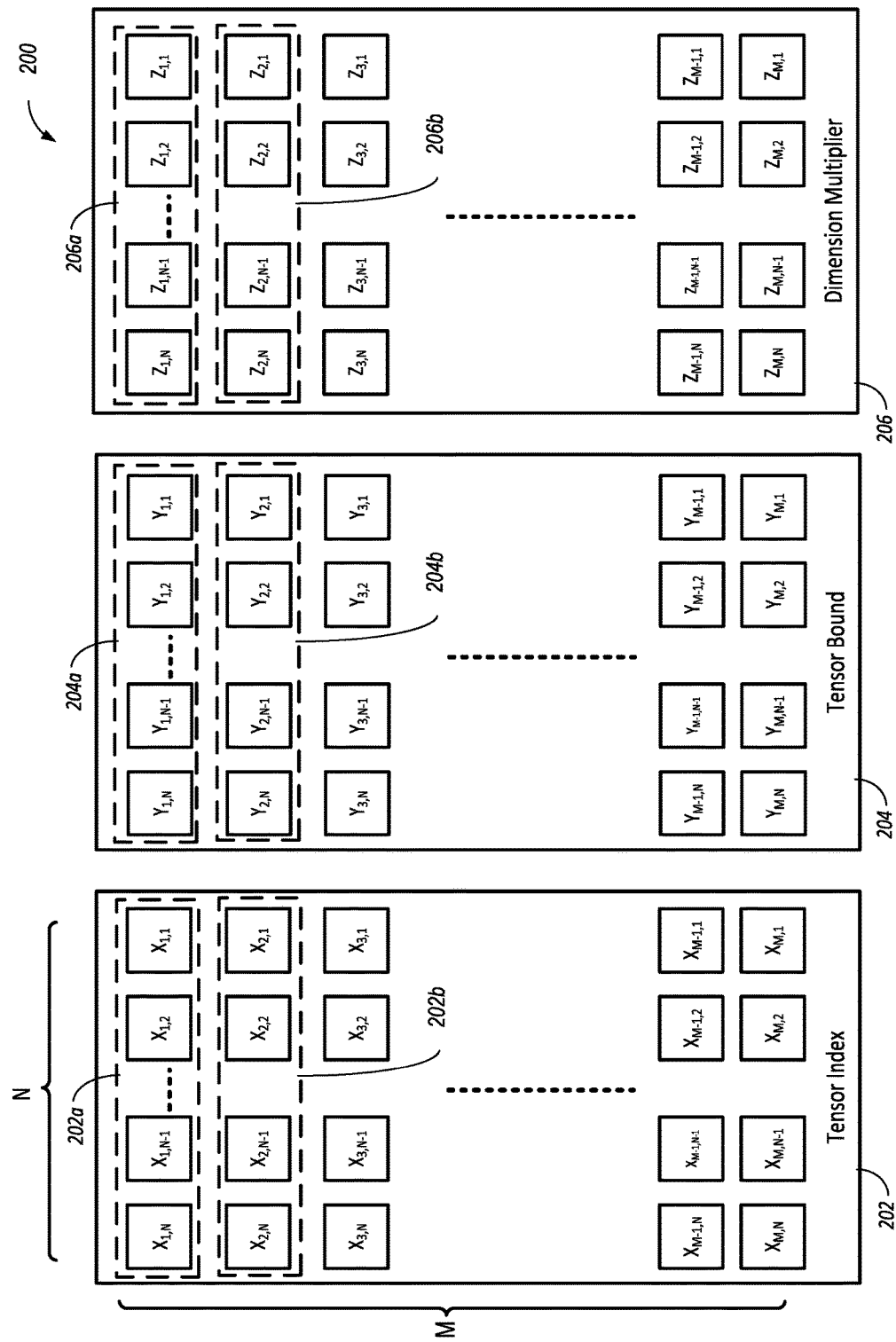
FIG. 2 illustrates an example tensor traversal unit.

FIG. 2 shows an example set of tensor status elements 200 of a tensor traversal unit. The tensor status elements 200 may correspond to the tensor status elements 122 of the tensor traversal unit 106. The tensor traversal unit 200 includes a group of tensor index elements 202, a group of tensor bound elements 204, and a group of dimension multiplier elements 206. The tensor index elements 202 can be physically or logically arranged as a 2-D array having M rows and N columns, where M and N are integers greater than or equal to one. In some implementations, each row of the tensor index elements 202 may represent tensor index information for a tensor. For example, if a program defines two array variables V1 and V2, the tensor traversal unit may assign rows 202a and 202b to track the tensor index information for array variables V1 and V2, respectively. In some implementations, each column of the tensor index elements 202 may represent tensor index information for nested loop index variable values that are associated with a tensor. For example, if the program defines a nested loop having three loops for accessing the variable V1, where each loop of the nested loop is indexed by nested loop index variables i, j, and k, the tensor traversal unit may assign tensor index element $X_{1,1}$, $X_{1,2}$, and $X_{1,3}$ to track the nested loop index variable i, j, and k, respectively.

The tensor bound elements 204 can be physically or logically arranged as a 2-D array having the same dimensions as the tensor index elements 202, where each element of the tensor bound elements 204 has a corresponding element in the tensor index elements 202. In some implementations, each row of the tensor bound elements 204 may represent tensor bound information for a tensor. For example, if the program defines two array variables V1 and V2, the tensor traversal unit may assign rows 204a and 204b to track the tensor bound information for array variables V1 and V2, respectively.

The dimension multiplier elements 206 can be physically or logically arranged as a 2-D array having the same dimensions as the tensor index elements 202, where each element of the dimension multiplier elements 206 has a corresponding element in the tensor index elements 202. In some implementations, each row of the dimension multiplier elements 206 may represent dimension multiplier information for a tensor. For example, if the program defines two array variables V1 and V2, the tensor traversal unit may assign rows 206a and 206b to track the dimension multiplier information for array variables V1 and V2, respectively.

In some implementations, rather than use a multiplier to multiply a tensor index value against a dimension multiplier, alternative embodiments can include a TTU 106 that utilizes an adder function in lieu of the multiplier function. In these embodiments, processing unit 102 can execute program code to provide TTU 106 with already multiplied numbers (e.g., for the begin, end, and step values of a particular loop).

Deep Neural Networks (DNNs) include multiple layers that feed into each other. In some implementations, an example neural network can include one or more of the following layer types: a convolutional layer (e.g., depth-wise), a reduction layer, a fully connected (FC) layer, a classifier layer, an element-wise multiply layer, or a pooling layer (e.g., average & max). In some implementations, computations that have small (e.g., one or two) input and output depths can be associated with layers that have a shallow kernel property, which can be a property of an existing layer such as a fully connected layer or convolutional layer. In general, tensor computations that occur within system 100 for a first layer (e.g. a convolution layer) can produce output activations that are subsequently provided as input activations for a second layer (e.g., a pooling layer) that differs from the first layer.

In some implementations, two or more compute systems 100 can be configured as a set of compute tiles. In these implementations, each compute tile independently performs a portion of the computations required to process inference workloads for a given layer. Outputs of the computations are then moved to another tile that needs the outputs to perform follow-on computations for the given layer. Moreover, a neural network layer can be partitioned in a manner desired by a system designer and each partition can be mapped to a tile such that a portion of computations correspond to a particular layer partition.

Referring again to FIG. 1, in some implementations, system 100 receives, via instruction 103, at least one instruction that encodes multiple operations that are executed by system 100 to perform at least a portion of the tensor computations required for a given neural network layer. The instruction and encoded operations can specify the type of layer, the structure of the activation tensor, and the structure of the weight tensor. Moreover, encoded operations can cause processing unit 102 to execute program code to create a loop nest structure that is defined at least in part by the layer type of the neural network. Regarding encoded operations, instruction set 103 can include at least one of a tensor operation (tensorop) instruction or a direct memory access operation (DMAop) instruction. Instruction set 103 can also include one or more other instructions that encode a variety of miscellaneous operations such as syncing operations, barrier operations and fencing operations (described below).

FIG. 3 illustrates a table 300 that includes opcodes and corresponding operations performed, at least in part, by the system 100. Table 300 includes operations 302, operations 304, and operations 308. As shown by table 300, system 100 can execute multiple operations that are encoded by, for example, a single instruction provided by instruction set 103. In general, instruction set 103 can include a standardized structure that uses opcodes to define the types of operations that are to occur within system 100 for a particular compute sequence. A unique opcode can correspond to a particular operation type. In some implementations, encoded operations in the form of one or more instructions, input activations, and weights are provided to system 100 from an external input/output (I/O) device or higher level controller device associated with a neural network hardware computing system. One or more data buses can be used to pass instructions, activations, and weights from an example I/O device or between multiple compute tiles (e.g., multiple systems 100) of a hardware computing system.

As shown by table 300, operations 302 are encoded tensor operations that can include one or more tensorops with corresponding opcodes. In some implementations, a single instruction or instruction set can include multiple sub-instructions that define encodings in the form of opcodes that indicate a particular tensorop. For example, the sub-instructions can be distributed to one or more compute tiles to cause the tiles to perform tensorops for computations that correspond to a particular neural network layer. For example, a tensorop sub-instruction can include opcodes for at least one of the above-mentioned layers: convolution, FC, pooling, reduction, or element-wise multiply. The tensorop sub-instruction can be configured such that all tensor computations that occur within a compute tile/system 100 have the needed encodings from the tensorop sub-instruction.

In general, tensor computations that occur within system 100 will have the needed encodings specified by instructions received from instruction set 103. When multiple systems 100 are arranged as a set of compute tiles, the tensorop sub-instructions and encodings can allow different compute tiles to execute different instructions. In some implementations, different sub-instructions can correspond to tensor computations for a certain partition of a neural network layer. The tensorop encoding further allows TTU 106 to emit the loop indices, to processing unit 102, via a main TTU loop nest field that indicates a desired TTU tensor operation. The tensorop encoding also enables a TTU 106 to generate the memory address for a particular array/tensor element based on a TTU loop mask that indicates which counters are added together to compute the address. The tensorop encoding can also provide multiple TTU loop nest instructions executable by processing unit 102 for traversing an input activation tensor, a weight tensor, and an output activation tensor.

In some implementations, when two or more compute systems 100 are configured as a set of compute tiles, each compute tile can be a self-contained unit which executes instructions independently. Generally, a compute tile executes instructions that define two types of operations: tensorops and DMAops. In some implementations, the different operations can be executed by independent control units within compute system 100 that synchronize on data through sync flag. However, although the control units are independent, there may be dependencies that need to be maintained, e.g., the tensorop must not execute a loop in the loop nest unless it has the data needed by the loop nest in, for example, a memory location of storage medium 104. The data required can be placed in storage medium 104 by a DMAop or another operation.

In general, data synchronization within system 100 occurs through sync flag operations. In some implementations, system 100 will have a register file that contains a sync flag entry per virtual write port. For example, a tensorop can have two or more tensor references that can be partial sums (written to second bank 114) and activations (written to first bank 112). In this implementation, there can be a sync flag register for each partial sum and activations. Moreover, during execution of a given instruction set, processing unit 102 can select a dimension of a tensor reference which will trigger an increment for a particular sync flag register. Furthermore, processing unit 102 can select the depth of a loop nest on which to wait for a required count on select sync flag registers. This ensures that the data dependencies are not violated. Moreover, one or more threads will stall if the required sync flag counts on selected sync flag registers are not yet reached.

For example, the tensorop encoding can allow for stalling of a loop nest based on one or more sync flag conditions. In some implementations, TTU 106 can be stalled due to the following conditions: 1) a predetermined sync flag condition is not met (e.g. sync flag counts not greater than a threshold count); or 2) there is a hazard detected in a particular stage of an instruction pipeline. Additionally, the tensorop encoding allows for configuring MAC operator 108 to receive a particular data value (e.g., activation or weight) of a desired bit width as well as allow for selection of a desired function to be performed by activation unit 110.

The sync flag conditions defined by the tensorop encoding can cause processing unit 102 of system 100 to execute at least one of a sync watcher operation and a sync producer operation. During execution of a tensorop by processing unit 102, the sync watcher operation can be used to indicate to processing unit 102 which loop iteration to sync on, the sync flag count required before a loop is permitted iterate, and how much to increment the expected sync flag count for the next iteration.

As shown by table 300, encoded direct memory access operations instructions can include one or more DMAops. DMA operations specified by instruction set 103 cause processing unit 102 to move data as required to accomplish performance of a particular tensorop by system 100. In some implementations, if data is moved between two memory resources of unequal widths (e.g., a wide memory unit and a narrow memory unit), the transfer size of the data must be a multiple of the wider resource. For example, given a DMAop that moves data to/from wide memory (W-mem), the size of the transfer must be a multiple of the wide memory width. Likewise, for a DMAop that moves data to/from narrow memory (N-mem), the size of the transfer of the data must be a multiple of the narrow memory width.

Wide and narrow designations used throughout the specification to describe attributes of a memory unit generally refer to an approximate size in width (bits/bytes) of one or more memory units. In some implementations, the memory width of first bank 112 and the memory width of second bank 114 are not defined by a specific number of bits such as, for example, 16-bit. In general, there are two different types of memories in each instantiation of system 100 and narrow/wide are relative terms used to indicate a characteristic of memory, which is not absolute. In some example implementations, first bank 112 includes one or more narrow memory units and second bank 114 includes one or more wide memory units.

As described above, instructions received by system 100 and executed by processing unit 102 can include the tensorop instruction and the DMAop instruction. The received instructions can be stored in instruction buffer 124 prior to execution by processing unit 102. As shown in table 300, operations 304 are DMA operations that can include instruction subtypes (e.g., indicating a 'write-to' buffer location) that include the following: 1) inbound instruction buffer; 2) outbound instruction buffer; 3) narrow-wide DMA instruction buffer; 4) wide-narrow DMA instruction buffer; and 5) ring bus DMA instruction buffer.

Referring now to table 300, execution of the DMAop.in operation by processing unit 102 causes system 100 to receive input activations and other data from instruction set 103 (via an example data bus) and to store the activations in first bank 112. As described in more detail below, the input activations are stored in first bank 112 at memory address locations that correspond to respective elements of an activation tensor. Execution of the DMAop.out operation by processing unit 102 causes system 100 to read data (e.g. output activations) from first bank 112 and write the data to an example data bus to output the data from system 100. Processing unit 102 can execute the DMAop.N-W operation to move data from first bank 112 (narrow memory) to second bank 114 (wide memory). Likewise, processing unit 102 can execute the DMAop.W-N operation to move data from second bank 114 (wide memory) to first bank 112 (narrow memory).

Processing unit 102 can execute the DMAop.R-bus operation to write data (e.g., weights/parameters) to second bank 114 after retrieving the data from instruction set 103 (via an example data bus). Execution of the DMAop.R-bus operation can also cause processing unit 102 to read/access data (e.g., weights) stored in memory address locations of second bank 114 and write the data to the example data bus such that the data can be output from system 100. In some implementations, the example data bus is a ring bus that connects multiple compute systems 100 in a ring structure. In addition to connecting the multiple systems 100 in a ring, the ring bus can also connect the multiple systems 100 to an external I/O device or higher level control device. Additional details and descriptions relating to hardware computing systems for accelerating neural network tensor computations including data bus options for connecting compute tiles are also described in U.S. patent application Ser. No. 15/335,769, entitled "Neural Network Compute Tile", filed on Oct. 27, 2016.

In some implementations, for a given set of compute tiles, at least one compute tile of the set of compute tiles can be a classifier tile. The classifier tile can be configured to apply a function to data values associated with tensor computations that have occurred for a particular layer of a neural network. For example, a FC layer can be partitioned across tiles, hence each tile produces a subset of outputs and stores the outputs in second bank 114. In general, a DMAop can be used to move, from a first compute tile and through the data ring bus, the linear outputs from memory address locations of second memory 114 to a second tile (e.g., classifier tile). The classifier tile will then apply at least one function (e.g., a softmax function) to each linear output and provide the post-function results to the higher level control device or the external I/O device.

Referring again to table 300, in some implementations, DMAop.infeed and DMAop.outfeed correspond to operations associated with both an external controller device and system 100. In general, the DMAop.infeed operation initiates at the external controller and causes the controller to provide both input activations and weights to an example data bus (e.g., the ring bus). The data bus can be configured to multicast a data stream (e.g., a bitmap) that indicates which compute tile in a multi-tile arrangement should consume the activations and weights. Accordingly, processing unit 102 of a particular receiving tile can therefore execute a portion of the DMAop.infeed operation to move activations and weights/parameters into the memory banks of the compute tile (system 100) from the external controller. Likewise, in some implementations, processing unit 102 can then execute a portion of the DMAop.outfeed operation to move results (outputs) of an example inference workload from memory banks 112, 114 in the compute tile to the classifier tile and from the classifier tile to the external controller. Moreover, the external controller can also execute a portion of the DMAop.outfeed operation to move inference workload results to an example external I/O device.

Operations 306 are tilefenceop and scalarfenceop operations that can be executed by processing unit 102 to manage issuance of new instructions while other operations are being executed by system 100. Execution of the tilefenceop instruction by processing unit 102 causes system 100 to block or prevent any new instructions from being issued to system 100 until all pending instructions in the respective instruction buffers of system 100 are retired. Additionally, the scalarfenceop instruction cooperates with the tilefenceop instruction to preclude issuance of new instructions while pending instructions are executed by processing unit 102. For example, the tilefenceop instruction can cause processing unit 102 to monitor a sync flag count metric associated with the tilefenceop. Processing unit 102 can execute the scalarfenceop instruction to prevent issuance of new instructions until a threshold tilefenceop count metric is reached.

Figures 4A, 4B:
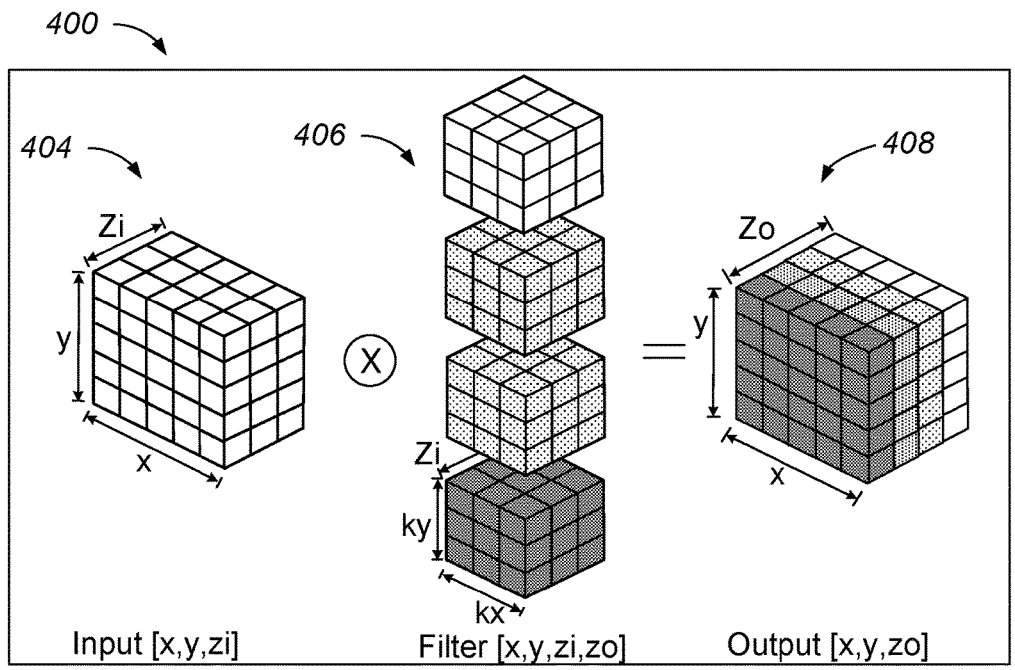
FIG. 4A illustrates an example activation tensor, an example weight tensor, and an example output tensor.
FIG. 4B illustrates an example loop nest that can be executed by a processing unit of the example computation system of FIG. 1.

FIG. 4A illustrates an example input activation tensor 404, example weight tensors 406, and an example output tensor 408. FIG. 4B illustrates an example deep loop nest 402 that can be executed by processing unit 102 to perform tensor computations relating to dot product computations or matrix multiplication. In FIG. 4A, computations can include multiplication of activation tensor 404 with parameter/weight tensor 406 on one or more computation cycles to produce outputs/results in the form of output tensor 408.

Each tensor 404, 406, 408 can include multiple data elements that are arranged in a row-column format across the x, y, and z dimensional planes. Activations can be read from respective memory address locations of first bank 112 that correspond to elements of activation tensor 404. Likewise, weights can be read from second bank 114 in respective memory address locations that correspond to elements of a weight tensor. In some implementations, processing unit 102 can execute program code stored in certain memory units of storage medium 104 (e.g., ROM/EEPROM memory units) for a nested loop program to cause TTU 106 to access memory address locations that correspond to respective elements of activation tensor 404 and weight tensor 406. Processing unit 102 can perform one or more tensor computations by, in part, executing a loop nest program to instantiate a plurality of loops that traverse tensor elements for a given dimension.

As TTU 106 traverses activation tensor 404 and weight tensor 406 multiply operations including a single activation from an x-dimension data element in tensor 404 is individually multiplied with, for example, a row of weights (multiple data elements) in the kx-dimension of a particular weight tensor 406. These multiply operations can produce a row of outputs corresponding to a first x row in the zo dimension of output tensor 408. In general, MAC operator 108 can execute tensor computations that include arithmetic operations relating to dot product computations. Input activations are provided, from first bank 112, one-by-one for respective access by a single MAC operator 108. MAC operator 108 multiplies the input activation with a weight accessed from second bank 114 to produce a single output activation value corresponding to a respective data element of output tensor 408.

In FIG. 4B, an example deep loop nest 402 is shown and includes a MAC operation in the inner-most loop (zo). Input dimensions corresponding to activation tensor 404 are indicated as [x, y, zi], filter dimensions corresponding to weight tensor 406 are indicated as [x, y, zi, zo], and output dimensions corresponding to output tensor 408 are indicated as [x, y, zo]. Deep loop nest 402 therefore specifies an output tensor 408 indicated by output [x][y][zo] based on computations that span the various dimensions of tensors 404, 406. In general, deep loop nest 402 provides a software algorithm that can be executed by system 100 to perform tensor computations by processing a nested loop to traverse N-dimensional tensors. In one example computational process, each loop may be responsible for traversing particular dimensions of corresponding N-dimensional tensors. Deep loop nest 402 therefore provides an expression of the one or more tensor computations that can be performed simultaneously within multiple compute tiles.

In alternative implementations, there can be other orderings of deep loop nest 402 that produce variations of output tensor 408. System 100 can receive instructions for instantiating deep loop nest 402 that include a range of data values to allow for traversing activation tensor 404 and weight tensors 406 in any order. One or more loops can be spatially unrolled in system 100. In some implementations, the xx and yy loop nests can be unrolled across one or more compute tiles thereby allowing different compute tiles to process inference workloads associated with different layer partitions. In example deep loop nest 402 there can be an activation read every cycle and partial sum read every zi*kx*ky cycles.

The structure of the loop nest (e.g., # of inner and outer loops) can be defined based on one or more of the data values of instructions provided to system 100 via instructions set 103. Example computations that occur within a convolution layer can be used as a basis to describe an execution of an instruction that encodes operations to compute inference workloads for a given layer. Convolution layer computations can include two-dimensional (2D) spatial convolution of three-dimensional (3D) tensors. Computations for the convolution layer can involve performing a 2D spatial convolution between a 3D activation tensor 404 and at least one 3D filter (weight tensor 406).

For this computation there will be a sum of the dot products along the depth dimension. Convolving one 3D filter 406 over the 3D input produces a 2D spatial plane. As shown, there can be multiple 3D filters with which the 3D input tensor 404 needs to be convolved. Computations will result in 3D tensor output 408. Although computations for a convolution layer are described, one or more instructions that encode compute operations for other neural network layers can also be produced based on the teachings described in this specification.

In general, when a single compute tile includes multiple MAC operators 108, the operators collectively provide single instruction multiple data (SIMD) functionality by each sharing a single activation input to perform their respective computations. SIMD generally means that all parallel units (multiple MAC operators 108 in a single system 100) share the same instruction (based on the deep loop nest), but each MAC operator 108 executes the instruction on different data elements of tensor 404 and 406. In one basic example, adding the arrays [1,2,3,4] and [5,6,7,8] element-wise to obtain the array [6,8,10,12] in one cycle will typically require four arithmetic units to execute the operation on each element. By using SIMD, the four units can share the same instruction (e.g., "add") and perform computations in parallel. A single instruction that encodes tensorops in the form a loop nest can be provided to one or more systems 100 to compute inference workloads associated with certain data elements of multi-dimensional tensors. Thus, system 100 provides enhanced acceleration and parallelism in tensor computations over prior methods.

Accelerator functions of system 100 correspond to at least two types of parallelism. The first type of parallelism is exposed through the spatial unrolling of the innermost loop of deep nest loop 402. Because system 100 includes SIMD functionality, the innermost loop bound of deep loop nest 402 can be fixed to the number of MAC operators 108 in a linear unit (e.g. cell of multiple MACs). The second aspect of parallelism is exposed by virtue of having configurations in which multiple compute tiles, each executing deep loop nest 402, but on different portions tensor computations for a particular neural network layer. There can be a configurable number of number of tiles in an accelerator device along with a configurable number of MAC operators within each tile.

In some implementations, a programmer or developer may choose to detail or construct a particular loop nest in order to, for example, reduce activation input bandwidth and increase the partial sum read bandwidth. This can be done by writing or constructing deep loop nest 402 in an alternative manner. Deep loop nests described in this specification for accelerating tensor computations are quite flexible and can be organized as desired to suit a particular problem set. The neural network and compute tile (system 100) described in this specification can support up to an eight deep loop nest computational structure, hence inputs and outputs can be tiled as desired by the developer, so as best to exploit locality and reduce overall bandwidth requirements.

Figure 5:
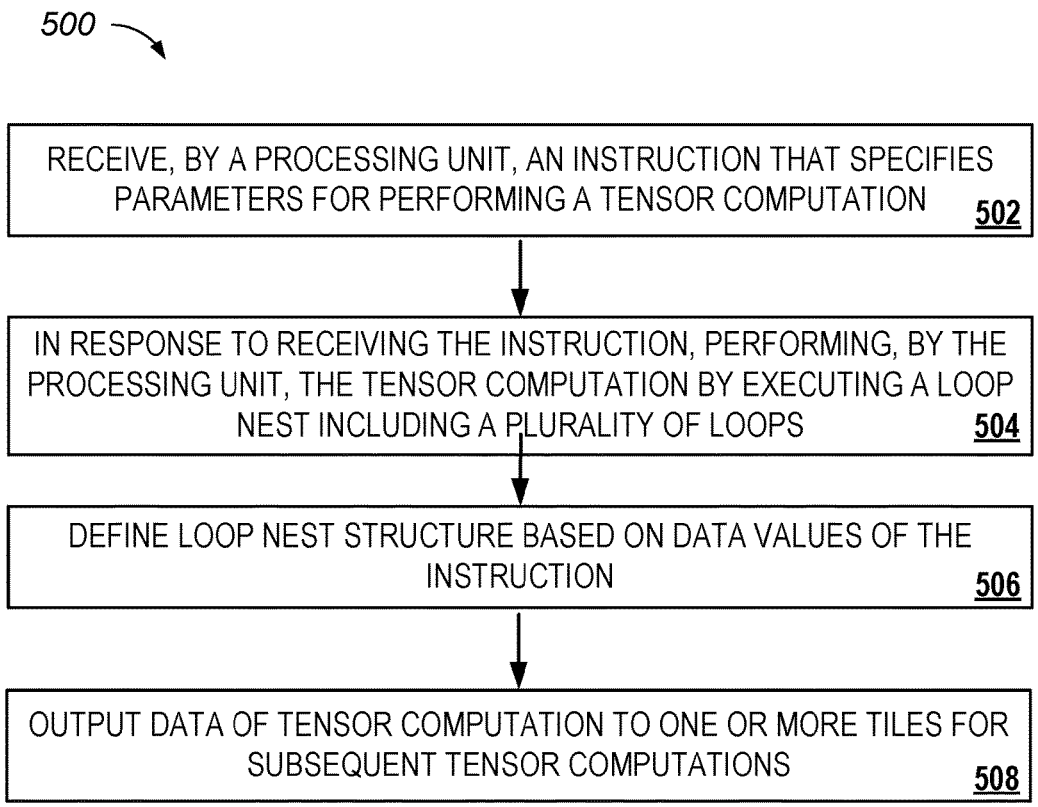
FIG. 5 is a flow diagram that illustrates an example of a process for performing tensor computations by way of a computer-implemented method.

FIG. 5 is a flow diagram that illustrates an example process 500 for performing tensor computations by using computing system 100 to execute one or more operations encoded by instructions. At block 502 processing unit 102 receives an instruction that specifies data values for performing tensor computations in system 100. At block 504, in response to receiving the instruction, processing unit 102 performs tensor computations by executing a loop nest that includes multiple loops. As discussed above, processing unit 102 can access instructions (distinct from instructions associated with instruction set 103) to execute program code for a nested loop program. Processing unit 102 can then execute the program code to cause TTU 106 to access memory address locations that correspond to respective elements of activation tensor 404 and weight tensor 406.

At block 506, for implementations where a loop nest has a defined structure based on a layer type, instruction set 103 can include specific data values (e.g., one or more opcodes) that indicate the layer type and loop nest structure for the layer. For example, as indicated by operations 302 of FIG. 3, instruction set 103 can include one or more opcodes that correspond to tensorops for tensor computations for a convolutional and FC layers (e.g., opcode 0). Thus, using data values associated with a tensorop instruction provided by instruction set 103, processing unit 102 can then define the loop nest structure based on data values of the instruction. Once the loop nest structure is defined, processing unit 102 performs one or more tensor computations by, in part, executing a loop nest program to instantiate loops that traverse tensor elements for a given dimension of activation tensor 404 and weight tensor 406.

At block 508, processing unit 102 causes individual output activations 116 to be written to respective data elements of output tensor 408. Additionally, at block 508 processing unit 102 can execute the DMAop.outfeed operation to cause the results of the tensor computations to be written to one or more other compute tiles for subsequent tensor computations. Alternatively, the DMAop.outfeed operation can move the results (outputs) of the inference workload from memory banks 112, 114 in a first compute tile to the classifier tile (e.g., second compute tile) and from the classifier tile to the external controller and to the external I/O device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), a GPGPU (General purpose graphics processing unit), or some other type of processor.

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method for accelerating inference computations for a neural network having a plurality of neural network layers and using a system comprising multiple hardware compute units, the method comprising:

providing, by a controller of the system, a respective single instruction to each hardware compute unit of the multiple hardware compute units, wherein each single instruction provided to the hardware compute units:
encodes a neural network layer type of a particular neural network layer of the plurality of neural network layers and identifies data values for performing a tensor computation for the particular neural network layer;

receiving, by a respective processing unit in each of the hardware compute units, the respective single instruction provided by the controller of the system to the hardware compute unit;

generating, by the respective processing unit in each of the hardware compute units, a respective loop nest comprising a plurality of loops, wherein the loop nest is generated based on the neural network layer type encoded by the single instruction; and performing, by the respective processing unit in each of the hardware compute units, a respective portion of the tensor computation by executing Hall the loop nest comprising Hall the plurality of loops generated by the processing unit, wherein the respective portion of the tensor computation performed by each of the hardware compute units is at least a subset of computations for a respective partition of the particular neural network layer.

2. The method of claim 1, wherein: a structure of the loop nest is defined at least in part by the neural network layer type of the particular neural network layer; and
executing the loop nest comprises accessing operands that correspond to elements of at least one multi-dimensional tensor.

3. The method of claim 1, wherein the single instruction causes the respective processing unit in each of the hardware compute units to access at least one element of a particular dimension of a tensor that includes at least three distinct dimensions, the element being a part of at least one index used in executing the loop nest during performance of the subset of computations for the respective partition of the particular neural network layer.

4. The method of claim 1, wherein the single instruction causes the respective processing unit in each of the hardware compute units to access at least one memory address of an array in a storage medium, the memory address of the array comprising a variable that is read by the respective processing unit during performance of the subset of computations for the respective partition of the particular neural network layer.

5. The method of claim 4, wherein performing the tensor computation comprises, providing, by the respective processing unit in each of the hardware compute units, at least one control signal to a tensor traversal unit (TTU) of the hardware compute unit to cause the TTU to emit loop indices used in executing the loop nest during performance of the subset of computations for the respective partition of the particular neural network layer.

6. The method of claim 4, further comprising, providing, by the respective processing unit in each of the hardware compute units, at least one control signal to the TTU to cause an array reference of the TTU to generate an address for a referenced array element used in executing the loop nest during performance of the subset of computations for the respective partition of the particular neural network layer.

7. The method of claim 6, wherein the single instruction indicates a first TTU counter that is summed with a second TTU counter to generate an address for an array reference associated with the TTU.

8. The method of claim 1, wherein performing the subset of computations for the partition of the neural network layer comprises, executing, by the respective processing unit in each of the hardware compute units, a sync procedure that manages operands associated with performance of the subset of computations, wherein managing an operand comprises stalling one or more loop nests based on a sync flag condition.

9. An electronic system comprising multiple hardware compute units for accelerating inference computations for a neural network having a plurality of neural network layers, the electronic system comprising:
  at least one processing unit, the at least one processing unit including one or more processing devices; and
  one or more non-transitory machine-readable storage devices for storing instructions that are executable by the one or more processing devices to cause performance of operations comprising:
    providing, by a controller of the electronic system, a respective single instruction to each hardware compute unit of the multiple hardware compute units, wherein each single instruction provided to the hardware compute units:
      encodes a neural network layer type of a particular neural network layer of the plurality of neural network layers and identifies data values for performing a tensor computation for the particular neural network layer;
    receiving, by a respective processing unit in each of the hardware compute units, the respective single instruction provided by the controller of the electronic system;
    generating, by the respective processing unit in each of the hardware compute units, a respective loop nest comprising a plurality of loops, wherein the loop nest is generated based on the neural network layer type encoded by the single instruction; and
    performing, by the respective processing unit in each of the hardware compute units, a respective portion of the tensor computation by executing the loop nest comprising the plurality of loops generated by the processing unit, wherein the respective portion of the tensor computation performed by each of the hardware compute units is at least a subset of computations for a respective partition of the particular neural network layer.

10. The electronic system of claim 9, wherein:
  a structure of the loop nest is defined at least in part by the neural network layer type of the particular neural network layer; and
  executing the loop nest comprises accessing operands that correspond to elements of at least one multi-dimensional tensor.

11. The electronic system of claim 9, wherein the single instruction causes the respective processing unit in each of the hardware compute units to access at least one element of a particular dimension of a tensor that includes at least three distinct dimensions, the element being a part of at least one index used in executing the loop nest during performance of the subset of computations for the respective partition of the particular neural network layer.

12. The electronic system of claim 9, wherein the single instruction causes the respective processing unit in each of the hardware compute units to access at least one memory address of an array in a storage medium, the memory address of the array comprising a variable that is read by the respective processing unit during performance of the subset of computations for the respective partition of the particular neural network layer.

13. The electronic system of claim 12, wherein performing the tensor computation comprises, providing, by the respective processing unit in each of the hardware compute units, at least one control signal to a tensor traversal unit (TTU) of the hardware compute unit to cause the TTU to emit loop indices used in executing the loop nest during performance of the subset of computations for the respective partition of the particular neural network layer.

14. A non-transitory computer-readable storage medium comprising instructions for accelerating inference computations for a neural network having a plurality of neural network layers and using a system comprising multiple hardware compute units, the instructions being executable by at least one processing unit which, upon such execution, causes performance of operations comprising:
  providing, by a controller of the system, a respective single instruction to each hardware compute unit of the multiple hardware compute units, wherein each single instruction provided to the hardware compute units:
    encodes a neural network layer type of a particular neural network layer of the plurality of neural network layers and identifies specific data values for performing a tensor computation for the particular neural network layer;
  receiving, by a processing unit in each of the hardware compute units, the respective single instruction provided by the controller of the system;
  generating, by the respective processing unit in each of the hardware compute units, a respective loop nest comprising a plurality of loops, wherein the loop nest is generated based on the neural network layer type encoded by the single instruction; and performing, by the respective processing unit in each of the hardware compute units, a respective portion of the tensor computation by executing the loop nest comprising the plurality of loops generated by the processing unit, wherein the respective portion of the tensor computation performed by each of the hardware compute units is at least a subset of computations for a respective partition of the particular neural network layer.

15. The non-transitory computer-readable storage medium of claim 14, wherein:
a structure of the loop nest is defined at least in part by the neural network layer type of the particular neural network layer; and
executing the loop nest comprises accessing operands that correspond to elements of at least one multi-dimensional tensor.

16. The non-transitory computer-readable storage medium of claim 14, wherein the single instruction causes the respective processing unit in each of the hardware compute units to access at least one element of a particular dimension of a tensor that includes at least three distinct dimensions, the element being a part of at least one index used in executing the loop nest during performance of the subset of computations for the respective partition of the particular neural network layer.

* * * * *